United States Patent
Cameron et al.

(10) Patent No.: US 9,898,077 B2
(45) Date of Patent: Feb. 20, 2018

(54) PLAYBACK SYSTEM FOR SYNCHRONISED SOUNDTRACKS FOR ELECTRONIC MEDIA CONTENT

(71) Applicant: Booktrack Holdings Limited, Takapuna (NZ)

(72) Inventors: Mark Steven Cameron, Discovery Bay (HK); Paul Charles Cameron, Milford (NZ); Craig Andrew Wilson, Rothesay Bay (NZ)

(73) Assignee: Booktrack Holdings Limited, Takapuna Auckland (NZ)

( * ) Notice: Subject to any disclaimer, the term of this patent is extended or adjusted under 35 U.S.C. 154(b) by 62 days.

(21) Appl. No.: 14/487,301

(22) Filed: Sep. 16, 2014

(65) Prior Publication Data

US 2015/0082136 A1    Mar. 19, 2015

Related U.S. Application Data

(60) Provisional application No. 61/879,317, filed on Sep. 18, 2013.

(51) Int. Cl.
*G11B 27/00* (2006.01)
*G06F 3/01* (2006.01)
(Continued)

(52) U.S. Cl.
CPC ............ *G06F 3/013* (2013.01); *G06F 17/22* (2013.01); *G09B 17/04* (2013.01); *G11B 27/005* (2013.01); *G11B 27/11* (2013.01)

(58) Field of Classification Search
CPC ................................ G09B 17/04; G06F 3/013
(Continued)

(56) References Cited

U.S. PATENT DOCUMENTS

2002/0054073 A1    5/2002   Yuen
2010/0324895 A1*  12/2010   Kurzweil ............. G10L 13/043
                                                      704/235
(Continued)

FOREIGN PATENT DOCUMENTS

EP      2179860      4/2010
GB      2490868      11/2012
(Continued)

OTHER PUBLICATIONS

"European Application No. 14185076.8, Extended European Search Report dated Jan. 16, 2015", (Jan. 16, 2015), 10 pgs.
(Continued)

*Primary Examiner* — Stephen Hong
*Assistant Examiner* — Sanchita Roy
(74) *Attorney, Agent, or Firm* — Schwegman Lundberg & Woessner, P.A.

(57) ABSTRACT

A method for displaying electronic text and synchronizing the playback of a soundtrack for the electronic text. The soundtrack contains multiple audio regions configured for playback during corresponding text regions of the electronic text. Playback of the audio regions of the soundtrack over an audio output system is based on a reading position counter indicative of the user's estimate reading position, and which increments based on a user reading speed variable. The user reading speed variable is updated by processing eye tracking signals from an eye tracker to determine the user's reading scan rate.

21 Claims, 8 Drawing Sheets

(51) Int. Cl.
*G06F 17/22* (2006.01)
*G11B 27/11* (2006.01)
*G09B 17/04* (2006.01)

(58) Field of Classification Search
USPC .................. 715/201, 203, 727, 730; 700/94
See application file for complete search history.

(56) References Cited

U.S. PATENT DOCUMENTS

| | | | |
|---|---|---|---|
| 2011/0195388 A1* | 8/2011 | Henshall | G09B 5/062 |
| | | | 434/317 |
| 2012/0001923 A1* | 1/2012 | Weinzimmer | G06F 3/013 |
| | | | 345/473 |
| 2012/0131491 A1 | 5/2012 | Lee | |
| 2013/0021373 A1 | 1/2013 | Vaught et al. | |
| 2013/0131849 A1 | 5/2013 | Mere | |
| 2013/0293488 A1* | 11/2013 | Na | G06F 3/013 |
| | | | 345/173 |
| 2014/0250219 A1* | 9/2014 | Hwang | G06F 17/2827 |
| | | | 709/224 |
| 2015/0077335 A1* | 3/2015 | Taguchi | G06F 3/0485 |
| | | | 345/156 |

FOREIGN PATENT DOCUMENTS

| | | |
|---|---|---|
| WO | WO-1996/007999 | 3/1996 |
| WO | WO-2006/100645 A2 | 9/2006 |
| WO | WO-2010/002275 A2 | 1/2010 |
| WO | WO-2010/018459 A2 | 2/2010 |
| WO | WO-2011/060106 A1 | 5/2011 |
| WO | WO-2013/015694 A1 | 1/2013 |
| WO | WO-2013/026725 A1 | 2/2013 |

OTHER PUBLICATIONS

"European Application No. 14185076.8, Response filed Dec. 30, 2015 to Extended European Search Report dated Jan. 16, 2015", (Dec. 30, 2015), 30 pgs.

* cited by examiner

PLAYBACK SYSTEM FOR SYNCHRONISED SOUNDTRACKS FOR ELECTRONIC MEDIA CONTENT

CLAIM OF PRIORITY

This application claims the benefit of priority of U.S. patent application Ser. No. 61/879,317, entitled "PLAYBACK SYSTEM FOR SYNCHRONISED SOUNDTRACKS FOR ELECTRONIC MEDIA CONTENT," filed on Sep. 18, 2013, the benefit of priority of which is claimed hereby, and which is incorporated by reference herein in its entirety.

FIELD OF THE INVENTION

The invention relates to a playback system and method for synchronized soundtracks for electronic media content, such as but not limited to text only or multimedia content comprising text presented in combination with imagery, videos or animations. The playback of the soundtrack is synchronized with the individual reading speed of the user.

BACKGROUND TO THE INVENTION

To enhance the reading experience, various systems have been proposed in which audio soundtracks relating to the content of text, such as an e-book, are produced and played to the user while they read the text. Some of these systems aim to synchronize the playback of the soundtrack with the user's reading speed.

One such system is described in the applicant's co-pending international PCT patent application publication WO2013/015694, the contents of which is hereby incorporated by reference in its entirety. In this system, a soundtrack for electronic text, such as an e-book, is produced that comprises audio tracks of different types that are configured to play concurrently and/or sequentially while the user is reading the electronic text. Playback of the soundtrack is synchronized with the reading speed of the user. The soundtrack may comprise a combination of different audio types, including ambient noise, sound effects, and background music that are configured to playback at a specific point or over specific portions of the electronic text in a synchronized manner as the user is reading those portions of the electronic text. The soundtrack in WO2013/015694 comprises multiple audio regions that are designated to playback during designated text portions of the electronic text. Each audio region comprises audio data defining the audio track to playback, the start position in the electronic text at which the audio region is to commence playback, and a stop position in the electronic text at which the audio region is to cease playback. In one embodiment described, the electronic text is indexed based on the number of words and the start and stop positions of the audio regions relate to a specific start and different stop word.

WO2013/015694 describes various user playback systems for displaying the electronic text and controlling playback of the associated soundtrack. The user playback system may be implemented on various user hardware devices, including portable consumer electronic devices such as smart phones, tablets and dedicated e-reader devices or personal computers, whether desktop or laptop. The soundtrack data file or files, including all the audio tracks, are entirely downloaded in advance and stored locally on the user device before playback can commence. In some embodiments, the soundtrack and audio track files are combined with the electronic text file as a single multimedia data file for download and playback. The user playback system processes the locally stored downloaded file or files and co-ordinates playback of the audio in accordance with a reading position counter that estimates the user's reading position in the electronic text. The reading position counter increments at a rate that is dependent on a user reading speed variable that is indicative of the user's reading speed. The accuracy of the user reading speed variable impacts on the accuracy of the synchronization of the soundtrack playback. In some forms, the reading speed variable is adjusted manually by the user, and in other forms the reading speed variable may be calculated and adjusted automatically from each page turn based on the number of words in the page and the time required to read the page.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

It is an object of at least some embodiments of the invention to provide a playback system and/or method for synchronized soundtracks for electronic media content that provides an improved form of automatic reading speed detection, or to at least provide the public with a useful choice.

In a first aspect, the invention broadly consists in a method for displaying electronic text and synchronizing the playback of a soundtrack for the electronic text, the soundtrack comprising multiple audio regions configured for playback during corresponding text regions of the electronic text, each audio region being defined by audio data comprising: an audio track for playback in the audio region, a start text position indicative of the word in the electronic text corresponding to where the playback of the audio track is to begin; and a stop text position indicative of the word in the electronic text comprising to where playback of the audio track is to cease, comprising: displaying at least a portion of the electronic text on a display; tracking the movement of at least one eye of the user with an eye tracker and generating representative eye tracking signals; determining the user's reading scan rate based on the eye tracking signals; calculating an estimate of the user's reading speed based on the determined reading scan rate and supplementary scan rate data relating to the electronic text and/or user; updating a user reading speed variable representing the user's reading speed based at least partly on the calculated estimate of the user's reading speed; maintaining a reading position counter corresponding to the estimated text position indicative of the word in the electronic text that the user is currently reading, the counter incrementing at a rate based on the user reading speed variable; and controlling playback of the audio regions of the soundtrack over an audio output system based on the audio data and reading position counter to synchronize playback of the audio regions with the user's estimated reading position.

In an embodiment, the reading scan rate is a line scan rate and determining the line scan rate comprises: processing the eye tracking signals from the eye tracker to detect line change eye movements; determining the user's line scan rate based on detected line change movements and a timer; and calculating an estimate of the user's reading speed based on the line scan rate and supplementary scan rate data indicative of the average or actual quantity of electronic text per line. In one form, the method comprises determining the user's line scan rate as an average line scan rate over multiple successive detected line change movements. In one example, the line scan rate is a moving average.

In another embodiment, the reading scan rate is a page turn rate and determining the page turn rate comprises: processing the eye tracking signals from the eye tracker to detect page change eye movements; determining the user's page turn rate based on the time interval between detected page change movements; and calculating an estimate of the user's reading speed based on the page turn rate and supplementary scan rate data indicative of the average or actual quantity of electronic text per page.

In another embodiment, the reading scan rate is a page turn rate and determining the page turn rate comprises: initiating a timer when the user turns to a new page of the electronic text; processing the eye tracking signals from the eye tracker to detect a page change eye movement; and calculating an estimate of the user's reading speed based on supplementary scan rate data indicative of the quantity of electronic text on the page and the value of the timer at the detected page change eye movement.

In an embodiment, the method further comprises processing the eye tracking signals to detect a page change eye movement, and generating a page turn signal in response to each detected page change eye movement to cause an electronic text display module to turn to the next page in the electronic text.

In another embodiment, the reading scan rate is a saccade rate and determining the saccade rate comprises: processing the eye tracking signals from the eye tracker to detect gaze fixation points between saccades; determining the user's saccade rate based on the time interval between detected gaze fixation points; and calculating an estimate of the user's reading speed based on the saccade rate and supplementary scan rate data indicative of the average or actual quantity of electronic text between gaze fixation points. In one form, the supplementary scan data comprises data indicative of the average quantity of text traversed per saccade for the user.

In a second aspect, the invention broadly consists in a system for displaying electronic text and controlling playback of a soundtrack synchronized to the reading speed of a user comprising: a display configured to display the electronic text; a user interface configured to receive user input to control the system; an audio output system that is operable to generate audio output for the user to hear; an electronic text display module configured to process electronic text data representing the electronic text and control display of the electronic text on the display in response to user input from the user interface; a soundtrack playback module configured to: generate a reading position counter corresponding to the estimated current text position indicative of the word in the electronic text that the user is currently reading, the reading position counter incrementing at a rate based at least partly on a configurable user reading speed variable representing the user's reading speed; and process soundtrack data representing the soundtrack to control playback of the soundtrack over the audio output system, the soundtrack data defining multiple audio regions for the soundtrack, each audio region being defined by audio data comprising: an audio track for playback in the audio region; a start text position indicative of the word in the electronic text corresponding to where the playback of the audio region is to begin; and a stop text position indicative of the word in the electronic text corresponding to where the playback of the audio region is to cease; and wherein the soundtrack playback module is configured to coordinate playback of the audio regions based on the reading position counter to synchronize playback of the audio regions of the soundtrack with the user's reading of the electronic text; and a reading speed detector that is configured to: track the movement of at least one eye of the user with an eye tracker to generate representative eye tracking signals; determine the user's reading scan rate based on the eye tracking signals; and calculate an estimate of the user's reading speed based on the determined reading scan rate and supplementary scan rate data relating to the electronic text and/or user, wherein the soundtrack playback module is configured to update the user reading speed variable at least partly based on the estimate of the user's reading speed as calculated by the reading speed detector.

In one embodiment, the reading scan rate is a line scan rate and the reading speed detector is configured to: process the eye tracking signals from the eye tracker to detect line change eye movements; determine the user's line scan rate based on the detected line change movements and a timer; and calculate an estimate of the user's reading speed based on the line scan rate and supplementary scan rate data indicative of the average or actual quantity of electronic text per line. In one form, the reading speed detector is configured to: determine the user's line scan rate as an average line scan rate over multiple successive detected line change movements. In one example, the line scan rate is a moving average.

In another embodiment, the reading scan rate is page turn rate and the reading speed detector is configured to: process the eye tracking signals from the eye tracker to detect page change eye movements; determine the user's page turn rate based on the time interval between detected page change movements; and calculate an estimate of the user's reading speed based on the page turn rate and supplementary scan rate data indicative of the average or actual quantity of electronic text per page.

In another embodiment, the reading scan rate is page turn rate and the reading speed detector is configured to: initiate a timer when the user turns to a new page of the electronic text; process the eye tracking signals from the eye tracker to detect a page change eye movement; and calculate an estimate of the user's reading speed based on supplementary scan rate data indicative of the quantity of electronic text on the page and the value of the timer at the detected page change eye movement.

In an embodiment, the system is further configured to process the eye tracking signals to detect a page change eye movement, and generate a page turn signal in response to each detected page change eye movement to cause the electronic text display module to turn to the next page in the electronic text.

In another embodiment, the reading scan rate is a saccade rate and the reading speed detector is configured to: process the eye tracking signals from the eye tracker to detect gaze fixation points between saccades; determine the user's saccade rate based on the time interval between detected gaze fixations; and calculate an estimate of the user's reading speed based on the saccade rate and supplementary scan rate data indicative of the average or actual quantity of electronic text between successive gaze fixation points. In one form, the supplementary scan rate data comprises data indicative of the average quantity of text traversed per saccade for the user.

In an embodiment, the system is implemented on a hardware system and the eye tracker comprises an optical sensor or sensors having a field of view that at least captures one or both of the user's eyes.

In a third aspect, the invention broadly consists in a method of estimating a reader's reading position in an electronic text comprising: using a first means to locate a first reading position of a user at a first time; detecting a reading scan rate by tracking a readers eye movement; using the reading scan rate to estimate a reading speed; and estimating the user's reading position at a second time based on the incremental time from the first time, the estimated reading speed and the first position.

In an embodiment, the first reading position is determined from any of the following: a page turn signal, a touch input on a touch screen display showing the electronic text, and/or or a navigational input for a traversing electronic text.

In a fourth aspect, the invention broadly consists in a method for displaying electronic text and synchronizing the playback of a soundtrack for the electronic text, the soundtrack comprising multiple audio regions configured for playback during corresponding text regions of the electronic text, each audio region being defined by audio data comprising: an audio track for playback in the audio region, a start text position indicative of the word in the electronic text corresponding to where the playback of the audio track is to begin; and a stop text position indicative of the word in the electronic text comprising to where playback of the audio track is to cease, comprising: displaying at least a portion of the electronic text on a display; tracking the movement of at least one eye of the user with an eye tracker to detect line change eye movements; determining the user's line scan rate based on detected line change movements and a timer; calculating an estimate of the user's reading speed based on the line scan rate and data indicative of the average or actual quantity of electronic text per line, updating a user reading speed variable representing the user's reading speed based at least partly on the calculated estimate of the user's reading speed; maintaining a reading position counter corresponding to the estimated text position indicative of the word in the electronic text that the user is currently reading, the counter incrementing at a rate based on the user reading speed variable; and controlling playback of the audio regions of the soundtrack over an audio output system based on the audio data and reading position counter to synchronize playback of the audio regions with the user's estimated reading position.

In some configurations, the method comprises determining the user's line scan rate as an average line scan rate over multiple successive detected line change movements. In some configurations, the line scan rate may be a moving average.

In some configurations, the method further comprises tracking the movement of at least one eye of the user with an eye tracker to detect page change eye movements; determining the user's page turn rate based on the time interval between detected page change movements; calculating an estimate of the user's reading speed based on the page turn rate and data indicative of the average quantity of electronic text per page; and further updating the user reading speed variable based on the calculated estimate of the user's reading speed.

In some configurations, the method further comprises initiating a timer when the user turns to a new page of the electronic text, tracking the movement of at least one eye of the user with an eye tracker to detect a page change eye movement; and calculating an estimate of the user's reading speed based on data indicative of the quantity of electronic text on the page and the value of the timer at the detected page change eye movement; and further updating the user reading speed variable based on the calculated estimate of the user's reading speed.

In some configurations, the method further comprises tracking the movement of at least one eye of the user with an eye tracker to detect a page change eye movement, and generating a page turn signal in response to each detected page change eye movement to cause an electronic text display module to turn to the next page in the electronic text.

In some configurations, the method further comprises tracking the movement of at least one eye of the user to detect gaze fixation points between saccades; determining the user's saccade rate based on the timer interval between detected gaze fixation points; calculating an estimate of the user's reading speed based on the saccade rate and data indicative of the average quantity of electronic text between gaze fixation points; and further updating the user reading speed variable based on the calculated estimate of the user's reading speed.

In a fifth aspect, the invention broadly consists in a system for displaying electronic text and controlling playback of a soundtrack synchronized to the reading speed of a user comprising: a display configured to display the electronic text; a user interface configured to receive user input to control the system; an audio output system that is operable to generate audio output for the user to hear; an electronic text display module configured to process electronic text data representing the electronic text and control display of the electronic text on the display in response to user input from the user interface; a soundtrack playback module configured to: generate a reading position counter corresponding to the estimated current text position indicative of the word in the electronic text that the user is currently reading, the reading position counter incrementing at a rate based at least partly on a configurable user reading speed variable representing the user's reading speed; and process soundtrack data representing the soundtrack to control playback of the soundtrack over the audio output system, the soundtrack data defining multiple audio regions for the soundtrack, each audio region being defined by audio data comprising: an audio track for playback in the audio region; a start text position indicative of the word in the electronic text corresponding to where the playback of the audio region is to begin; and a stop text position indicative of the word in the electronic text corresponding to where the playback of the audio region is to cease; and wherein the soundtrack playback module is configured to coordinate playback of the audio regions based on the reading position counter to synchronize playback of the audio regions of the soundtrack with the user's reading of the electronic text; and a reading speed detector that is configured to: track the movement of at least one eye of the user with an eye tracker to detect line change eye movements; determine the user's line scan rate based on the detected line change movements and a timer; and calculate an estimate of the user's reading speed based on the line scan rate and data indicative of the average or actual quantity of electronic text per line, wherein the soundtrack playback module is configured to update the user reading speed variable at least partly based on the estimate of the user's reading speed as calculated by the reading speed detector.

In some configurations, the reading speed detector may be configured to: determine the user's line scan rate as an average line scan rate over multiple successive detected line change movements. In some configurations, the line scan rate may be a moving average.

In some configurations, the reading speed detector may be further configured to: track the movement of at least one eye of the user with an eye tracker to detect page change eye movements; determine the user's page turn rate based on the time interval between detected page change movements; calculate an estimate of the user's reading speed based on the page turn rate and data indicative of the average quantity of electronic text per page; and wherein the soundtrack playback module is configured to further update the reading speed variable based on the calculated estimate of the user's reading speed.

In some configurations, the reading speed detector may be further configured to: initiate a timer when the user turns to a new page of the electronic text; track the movement of at least one eye of the user with an eye tracker to detect a page change eye movement; and calculate an estimate of the user's reading speed based on data indicative of the quantity of electronic text on the page and the value of the timer at the detected page change eye movement; and wherein the soundtrack playback module is configured to further update the reading speed variable based on the calculated estimate of the user's reading speed.

In some configurations, the system may further be configured to track the movement of at least one eye of the user with an eye tracker to detect a page change eye movement, and generate a page turn signal in response to each detected page change eye movement to cause the electronic text display module to turn to the next page in the electronic text.

In some configurations, the reading speed detector may be further configured to: track the movement of at least one eye of the user to detect gaze fixation points between saccades; determine the user's saccade rate based on the timer interval between detected gaze fixations; calculate an estimate of the user's reading speed based on the saccade rate and data indicative of the average quantity of electronic text between successive gaze fixation points; and wherein the soundtrack playback module is configured to further update the reading speed variable based on the calculated estimate of the user's reading speed.

In some configurations, the system is implemented on a hardware system and the eye tracker comprises an optical sensor or sensors having a field of view that at least captures one or both of the user's eyes. In one example, the hardware system may be a desktop, laptop, tablet, smartphone or similar, and the optical sensor(s) may comprise digital cameras of the hardware system. In some examples, the digital cameras may be provided or located about the periphery of the display. In another example, the hardware system may be a wearable computer or computing device, such as a head-mounted display, that is provided with one or more user-facing cameras. In another example, the hardware could be embedded in a contact lens or glasses to detect eye movement.

In some configurations, the eye tracker may be configured to detect the user's eye movements by capturing and processing images (still or video) of the user's eyes. In some forms, the eye movements are detected directly from the images. In other forms, the images are processed to detect the user's gaze point (e.g. pixel position) on the display and the eye movements are detected indirectly based on tracking the movement of the detected gaze point.

In a sixth aspect, the invention broadly consists in a method of estimating a reader's reading position in an electronic text comprising: using a first means to locate a first reading position of a user at a first time; detecting a line scan rate by tracking a readers eye movement; using the line scan rate to estimate a reading speed; and estimating the user's reading position at a second time based on the incremental time from the first time, the estimated reading speed and the first position.

In some configurations, the first reading position is determined based on a page turn signal, a touch input on a touch screen display showing the electronic text, or other navigational input for a traversing electronic text.

In a seventh aspect, the invention broadly consists in a non-transitory computer-readable medium having stored thereon computer readable instructions that, when executed on a processing device or devices, cause the processing device to perform the method of the first, third, fourth or sixth aspects of the invention.

Defintions

The term "soundtrack" as used in this specification and claims is intended to mean, unless the context suggests otherwise, a soundtrack for playback while reading electronic media content and of the type described in WO2013/015694 which comprises multiple audio regions that are configured for playback at predetermined reading positions or regions within the electronic media content, and where the playback timing of the soundtrack is synchronized with the user based on their estimated reading position and/or reading speed.

The phrase "text position" as used in this specification and claims, unless the context suggests otherwise, is intended to refer to a position or location within the electronic text such as typically a line or word or character of the electronic text or any other arbitrary selected position with the electronic text, and the position may be referenced or identified in any suitable manner appropriate to the electronic text, whether indirectly or directly, including but not limited to: an index value, numeric or otherwise, corresponding to the index position of a line, word or character in the electronic text for an electronic text that has been indexed, including a line number, word number of character number for example; or any other positional reference scheme for identifying locations within electronic text.

The phrase "hardware system" as used in this specification and claims is intended to mean, unless the context suggests otherwise, any form of computing, processing or programmable electronic device, platform or system including, but not limited to, portable or non-portable consumer electronic devices such as smart phones, cell phones, tablets, smart watches, e-Reader or e-book devices, laptops, and notebooks, gaming machines or consoles, server, smart televisions, general purpose computers such as desktop computers, specific purpose computers, wearable computers or computing devices such as head-mounted displays or eyewear or contact lens or the like, and is intended to include one or more linked or communicating hardware or processing devices or systems which work together.

The phrase "electronic media content" as used in this specification and claims is intended to mean, unless the context suggests otherwise, any electronic media content comprising electronic text, whether alone or in combination with embedded static or animated imagery or graphics (e.g. video), the electronic media content being in any format or file-type capable of being rendered on an electronic display, and including, but not limited to, an electronic book or e-book, a webpage, digital video, comic, or slide show presentation.

The phrase "reading scan rate" as used in this specification and claims is intended to mean, unless the context suggests otherwise, a measure or metric indicative of the rate a user reads or scans text and/or imagery, and encompasses various resolutions, including but not limited to high-resolution reading scan rate such as saccade rate, e.g. number of saccades a user makes per unit of time, medium-resolution reading scan rate such as line scan rate, e.g. number of lines a user reads per unit of time, and low-resolution reading scan rate such as page turn rate, e.g. number of pages a user reads per unit of time, and where the reading scan rate, in which ever resolution, may be converted into a measure or metric of user reading speed at the word-level, such as words per minute (wpm) or similar, based on supplementary scan rate data relating to the text and/or user such as data indicative of the average or an actual quantity of text associated with the various resolutions for a particular item of displayed electronic text and/or related to the individual reader, including by way of example data indicative of any of the following: the actual or average number of words read per saccade for the reader, the actual or average number of words per line, and/or or the actual or average number of words per page.

The phrase "line change eye movement" as used in this specification and claims is intended to mean, unless the context suggests otherwise, a movement of the user's eye or eyes that is indicative of the user changing or jumping from the end of one line (whether horizontally oriented for English or vertically oriented in other languages) to the start of the next line in displayed electronic text, and for example in English language text would be equivalent to an eye movement in which the user's gaze traverses from at or toward the right-hand margin to the left-hand margin of the displayed horizontal rows of text, or in Japanese language text would be equivalent to an eye movement in which the user's gaze traverses from bottom to top of the displayed columns of text, i.e. an eye movement in the opposite direction of the reading direction of a line of text.

The phrase "line scan rate" as used in this specification and claims is intended to mean, unless the context suggests otherwise, a numerical value indicative of the number of lines a user reads per unit of time, such as number of lines per second or per minute or other suitable time unit.

The phrase "page change eye movement" as used in this specification and claims is intended to mean, unless the context suggests otherwise, any movement of the user's eye or eyes that is indicative of the user changing or jumping from the end of one page of electronic text to the start of the next page of electronic text, and the type of eye movements may vary dependent on the language of the text, and the display form the electronic text, e.g. whether single page view or two page view, and for example in English language text for a single page view would be equivalent to a gross eye movement in which the user's gaze traverses from at or toward the bottom (typically but not necessarily the right-hand corner) of the display to the top (typically but not necessarily the left-hand corner) of the display.

The phrase "page turn rate" as used in this specification and claims is intended to mean, unless the context suggests otherwise, a numerical value indicative of the number of pages a user reads per unit of time, such as number of pages per minute or other suitable time unit.

The term "saccade" as used in this specification and claims is intended to mean, unless the context suggests otherwise, the rapid (often jerky) movement of a user's eye or eyes as they jump from one gaze fixation point to the next gaze fixation point when reading, and whether in a horizontal direction for text in languages such as English, or vertical movements for text in languages such as Japanese.

The phrase "saccade rate" as used in this specification and claims is intended to mean, unless the context suggests otherwise, a numerical value indicative of the number of saccades a user makes per unit of time, such as number of saccades per second or minute or other suitable time unit.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

The invention consists in the foregoing and also envisages constructions of which the following gives examples only.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

BRIEF DESCRIPTION OF THE DRAWINGS

Preferred embodiments of the invention will be described by way of example only and with reference to the drawings, in which.

DETAILED DESCRIPTION OF PREFERRED EMBODIMENTS

1. Overview of Synchronised Soundtracks

Figure 1:
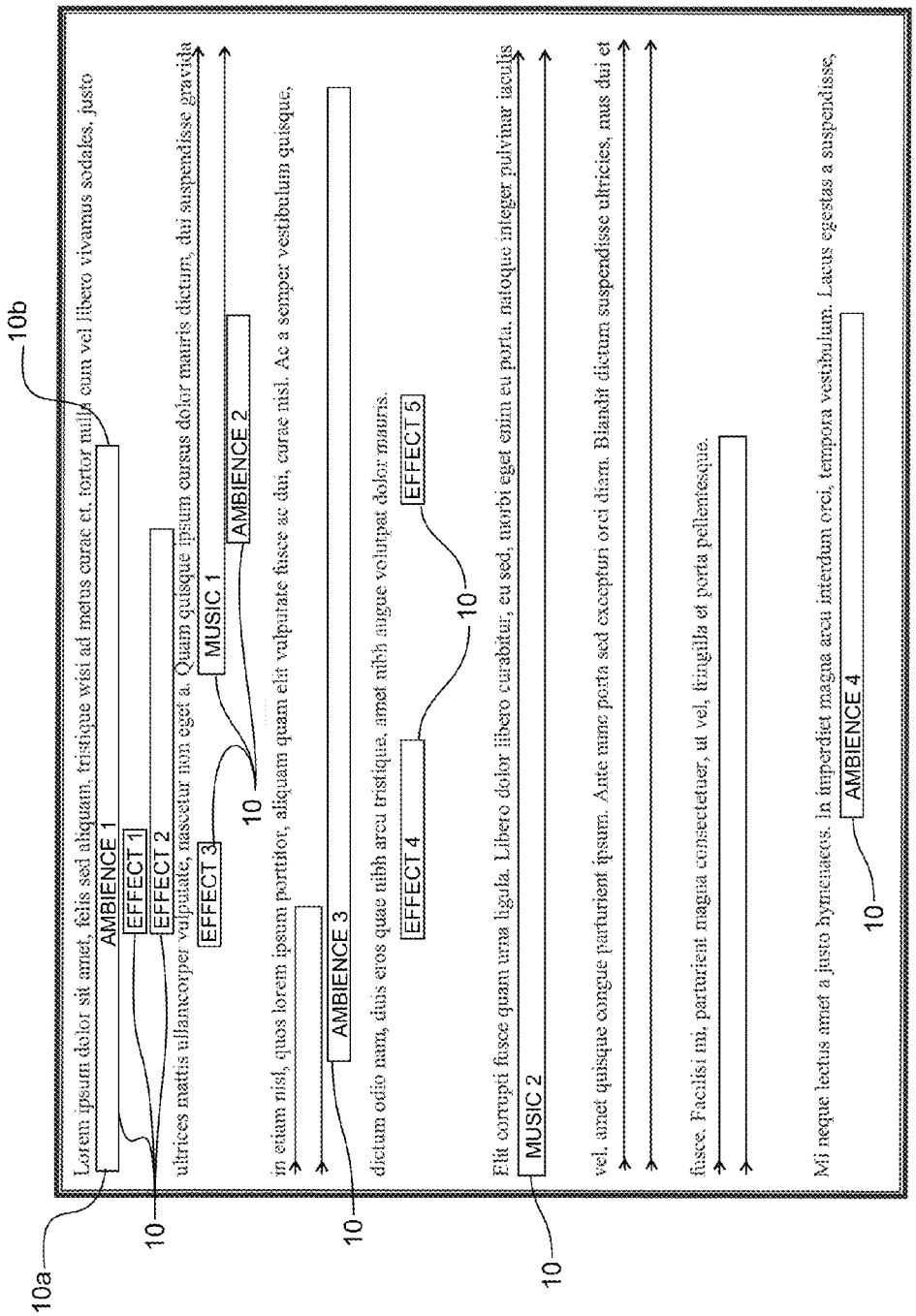
FIG. 1 is a schematic data illustration of a portion of text and the associated audio regions of a soundtrack configured for playback during the reading of the electronic text.

This invention relates to delivery of soundtrack of the type described in WO2013/015694, as referred to above. The soundtracks are created to enhance the user's reading experience for an item of electronic text.

The soundtracks may be applied to electronic text in any format or file-type, including but not limited to those associated with the following file extensions: aeh, djvu, epub, fb2, html, xhtml, azw, lit, prc, mobi, KF8, exe, pdb, txt, pdb, pdf, ps, rgo, pdb, tr2, tr3, wol, rtf, doc, docx, asc, lit, wri, odt, text, pwi, rtx, sdw, strings, utf8, utf16, wp*, wpw, wri, wtx, asc, csv, lwp, dtp, indd, pmd, ppp, pub, fm, and any type of markup language types, including but not limited to SGML, HTML, XHTML, HTML5, XML, and LaTex. The electronic text may be in the form of any electronic media content whether comprising text only or text in combination with imagery or graphics, whether static or moving (e.g. video or other animations). By way of example, but not limited to, the electronic media content may be in the form of an e-book, a webpage, or any other electronic media content format.

The soundtrack is customized to the electronic media content and in particular customized to the content of the electronic text to enhance the reading experience for a reader of the electronic text. The soundtrack may comprise audio tracks of different types and may be configured to play concurrently, sequentially, or both while the user is reading the electronic text. Playback of the soundtrack is synchronized with the reading speed of the user. In one example, the electronic text may be a fiction or non-fiction book, and the soundtrack may comprise a combination of different audio types, including ambient noise, sound effects, and background music that may be configured to play back at a specific point or over specific portions of the electronic text in a synchronized manner as the user is reading those portions of the electronic text.

The soundtrack comprises multiple audio regions that are designated to playback during designated text portions of the electronic text. Each audio region comprises audio data defining the audio track to playback and audio properties defining the desired nature of the playback. The audio data specifies a start text position in the electronic text at which the audio region is to commence playback and a stop text position at which the audio region is to cease playback. In one embodiment, the electronic text is designated a numerical text index based on the number or words or characters in the electronic text, and the start and stop text positions are defined by corresponding start and stop index values respectively. In one example, the indexing of the text is based on the number of words in the electronic text such that each word has a unique index value representing its position in the electronic text. The index values for each word may correspond to their word number or word count in the electronic text. In this example, the audio regions playback between start and stop index values representing the selected start word and stop word in the electronic text for that audio region.

When the user is reading the electronic text, a reading position counter or identifier is maintained which corresponds to the text position (e.g. word) in the electronic text at which the user is estimated as currently reading. The reading position counter increments or changes at a rate at least partially based on a user reading speed variable indicative of the user's reading speed. This reading position counter allows the playback of the audio regions of the soundtrack to be synchronized with the user's reading speed such that playback of an audio region is triggered when the reading position counter matches the start index value of the start word for the audio region, and likewise ceases when the reading position counter matches the stop index value of the stop word of the audio region.

In alternative embodiments, other reading position referencing scheme may be employed in contrast to word or character based indexing. In other embodiments, the start and stop positions of each audio region may be defined by any other document or text position referencing scheme or system. One such example is the ePub canonical fragment identifier (CFI). In such an example, the start and stop positions in the audio region will be defined by the CFI parameter or ranges, and a reading position variable would be maintained in the CFI format which changes or increment based on the user's reading speed to trigger the playback of the audio regions of the soundtrack when their CFI value match the reading position variable.

The soundtrack comprises multiple audio regions and playback of two or more regions may partially or entirely overlap such that two or more audio regions can playback concurrently if desired. The soundtrack is provided with multiple channels for playback and overlapping audio regions are designated different channels in the set of available channels to allow for concurrent playback. This enables different audio tracks, such as sound effects, ambient noise, or background music to be concurrently played and mixed together to provide an overall soundtrack that enhances the user's reading experience for that particular electronic text. Typically, the audio data for each audio region includes an audio type, such as "music", "ambience", or "effect". The selected audio type is intended to define the nature of the audio region. For example, if an audio region is for background music, then the audio type selected will be "music". If the audio region is a sound effect, then the "effect" audio type is selected. If the audio region is intended to be an ambient sound or noise, then the "ambience" audio type is selected.

By way of example, FIG. 1 shows a portion of electronic media content comprising electronic text only. FIG. 1 also overlays the text with a schematic representation of a number of audio regions 10 configured for playback during reading of the electronic text in the schematic representation, the audio regions 10 are each represented by a bar or underline that extends below the portion of text to which it relates. The start of each bar or underline of the audio region represents the start position at which the audio track of that audio region will commence playback and the end 10 represents the position in the electronic text at which the audio track of the audio region will cease playback. Each audio region may extend over a single word or group of words, a line, multiple lines or even pages. As shown the audio regions may overlap such that they playback concurrently.

Figure 2:
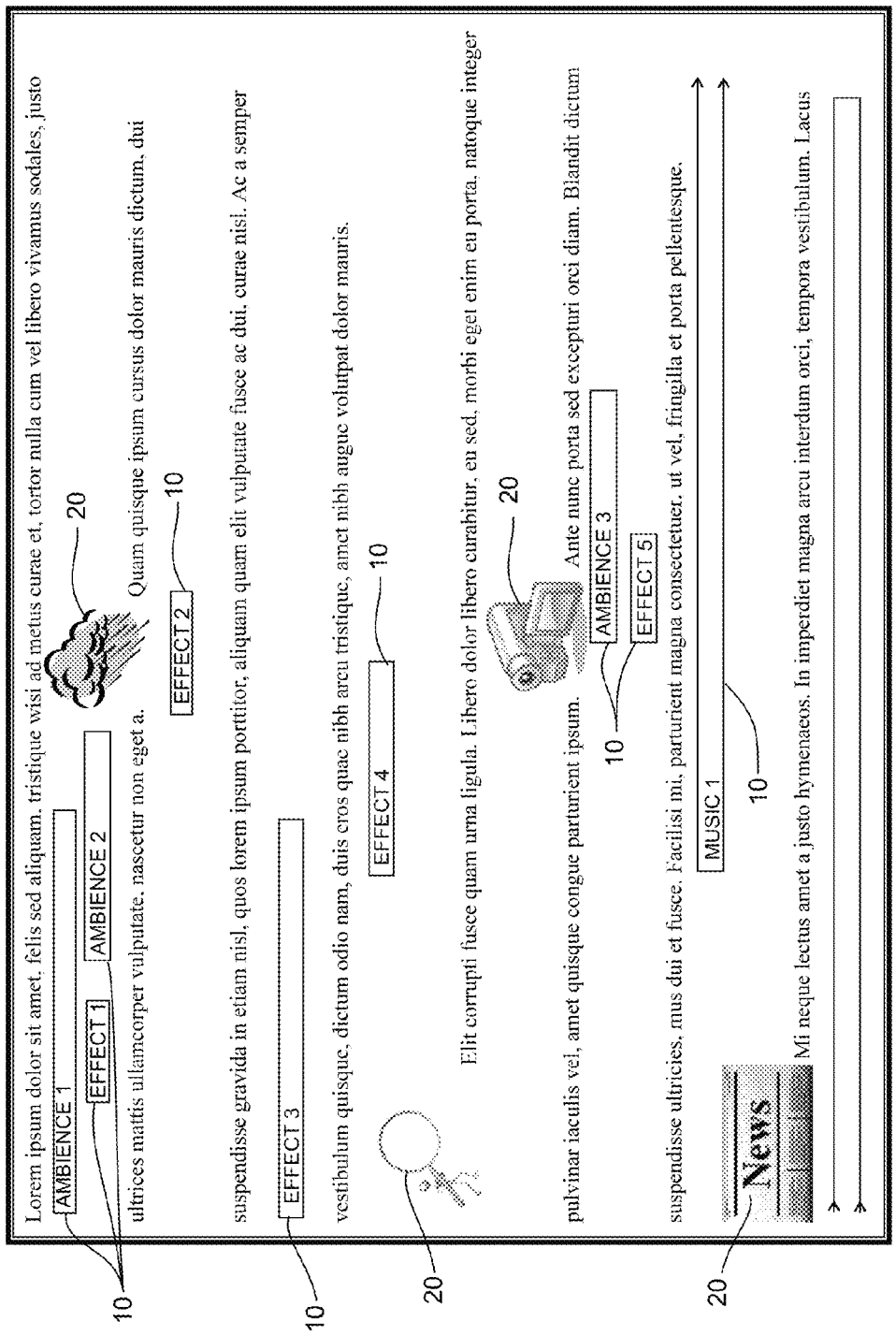
FIG. 2 is a schematic data illustration similar to FIG. 1 except showing a soundtrack of the invention configured for electronic media content comprising text and images.

Referring to FIG. 2, the electronic media content may comprise multimedia content comprising text and imagery, whether static or moving. FIG. 2 shows such an electronic text containing static images 20. For such electronic media content, the soundtrack audio region may have start and stop positions which either correspond to text or imagery. For example an audio region may be configured to start on a particular word, and then end when a user is expected to be looking at a particular image embedded within the text. Alternatively, an audio region may be configured to commence playback when a user is expected to be viewing a particular embedded image (whether static or video).

2. Hardware System

An embodiment of the playback system for displaying electronic text (e.g. an e-book 31) and controlling playback of an associated soundtrack 33 will now be described.

In this embodiment, the user playback system may be provided or implemented as an application program, website, plug-in, or any other form of software, whether stand-alone or integrated or embedded with other software, running on any suitable electronic hardware system or platform or device. Typically the playback system is implemented on any suitable portable or non-portable hardware device or system having suitable processor and memory capabilities, a display for displaying the electronic text, and an audio output system for playback of the soundtrack over speakers or headphones. By way of example only, the hardware device or system may be portable consumer electronic devices such as smart phones, cell phones, tablets, smart watches, dedicated e-Reader or e-book devices, laptops, notebooks, wearable computers or computing devices such as optical head-mounted or head-worn displays (e.g. Google Glass eyewear) or contact lens or any other suitable electronic devices. Alternatively, the playback system may be implemented on a desktop personal computer or any other non-portable hardware system if desired. Typically, the playback system is provided as an application program or software that may be loaded and run on the hardware devices or systems mentioned above, but it will be appreciated that a dedicated electronic device may be configured and built as a stand-alone user playback system if desired. It will be appreciated that the user playback system may be implemented in the form of a website interface. For example, a user may access the website over the internet that is configured to provide a playback system for viewing the electronic text and providing playback of the corresponding soundtrack via the user's internet browser.

Figure 3:
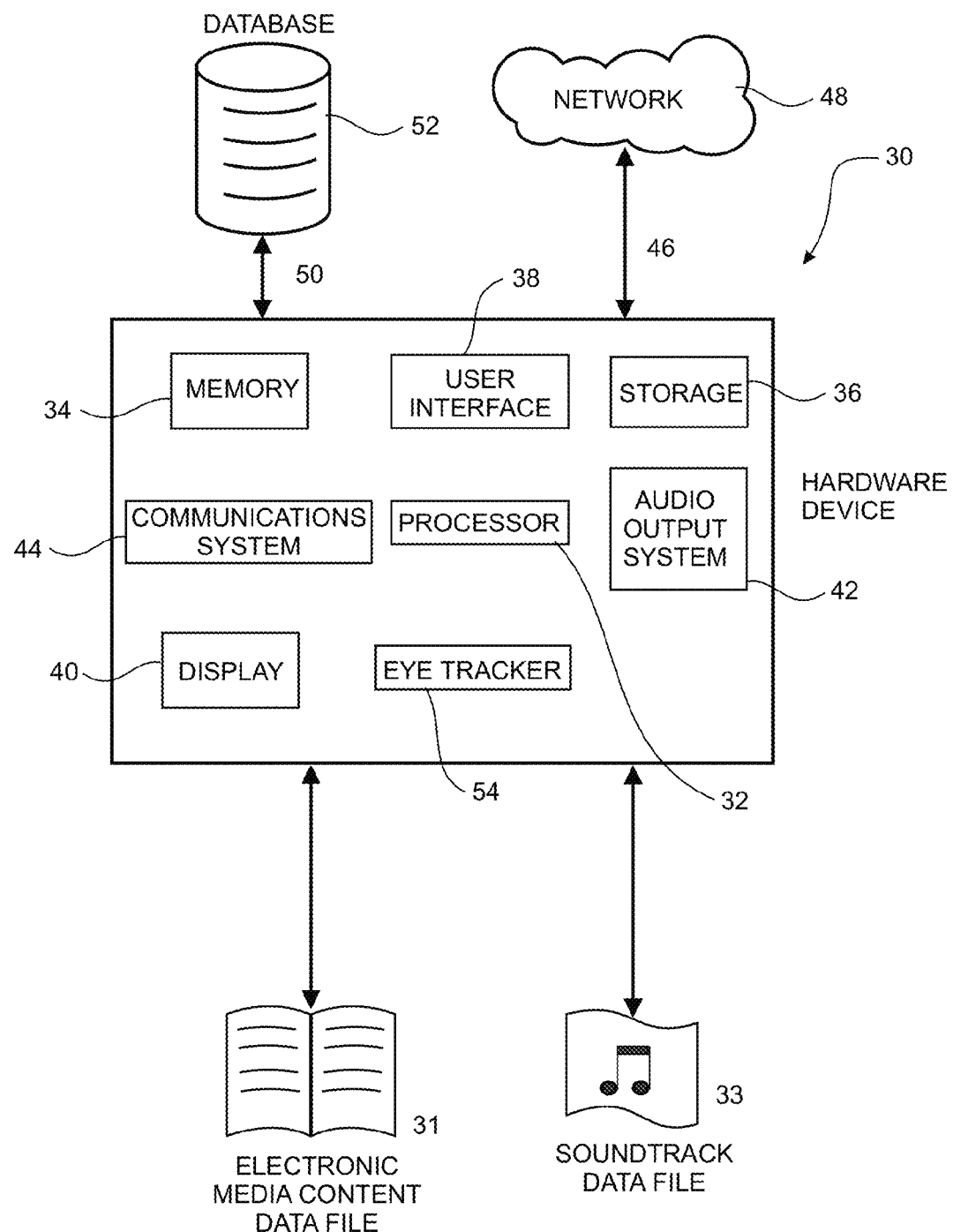
FIG. 3 is a schematic diagram of a typical hardware system for implementing the playback system in accordance with an embodiment of the invention.

Referring to FIG. 3, an example of the hardware device 30 upon which the playback system software may run is shown. The hardware device 30 includes a processor 32 for executing software or computer-readable instructions, memory 34 for data processing and execution of instructions, data storage 36 such as a hard disk drive for data storage, a user interface 38 (e.g. buttons, touch screen, keyboard, mouse input, voice commands, or the like, whether alone or in combination) to enable the user to interact with the hardware device and software, a display 40 for displaying graphical user interfaces (GUIs) of the playback system software, and an audio output system 42 for producing audio output over speakers or headphones. The hardware device 30 may also comprise external device interfaces and/or communication modules 44 for establishing communication links 46 to external networks 48, such as the internet or an extranet or intranet or communication links 50 to external databases or servers 52, such music libraries.

The hardware device also is connected to or has an integrated eye tracker 54 for tracking the movement of one or both of the user's eyes. Various eye tracker technologies are known. In this embodiment, the eye tracker is a non-contact, non-invasive optical eye tracker. In some forms, the eye tracker may be configured to track the pupil or eye ball movements and generate representative eye movement signals. In other forms, or alternatively may be configured to track the user's eye movements to detect their gaze point on the display screen and generate representative gaze point signals, such as pixel co-ordinates. In such forms, typically, the eye tracker detects eye movement or gaze direction based on detecting corneal reflections of infrared light, using one or more optical sensors, such as infrared cameras for example, and image processing. It will be appreciated that the eye tracking signals generated by the eye tracker may be eye movement signals or gaze point signals or a combination of both.

In this embodiment, the eye tracker typically comprises or uses at least one user-facing camera integrated with or provided about the periphery of the display screen, as are commonly provided on many laptops, smartphones, tablets and the like. In some forms, the camera may be a webcam. In some forms, the camera or cameras may be mounted or provided on a wearable computer or computing devices such as optical head-mounted or head-worn displays (e.g. Google Glass eyewear). In some forms the eye tracker may be software that operates the camera or cameras and processes the captured images to generate representative eye movement signals or which otherwise is programmed to detect particular eye movement for use in a reading speed detector to be explained in further detail later.

3. Software Functionality

Figure 4:
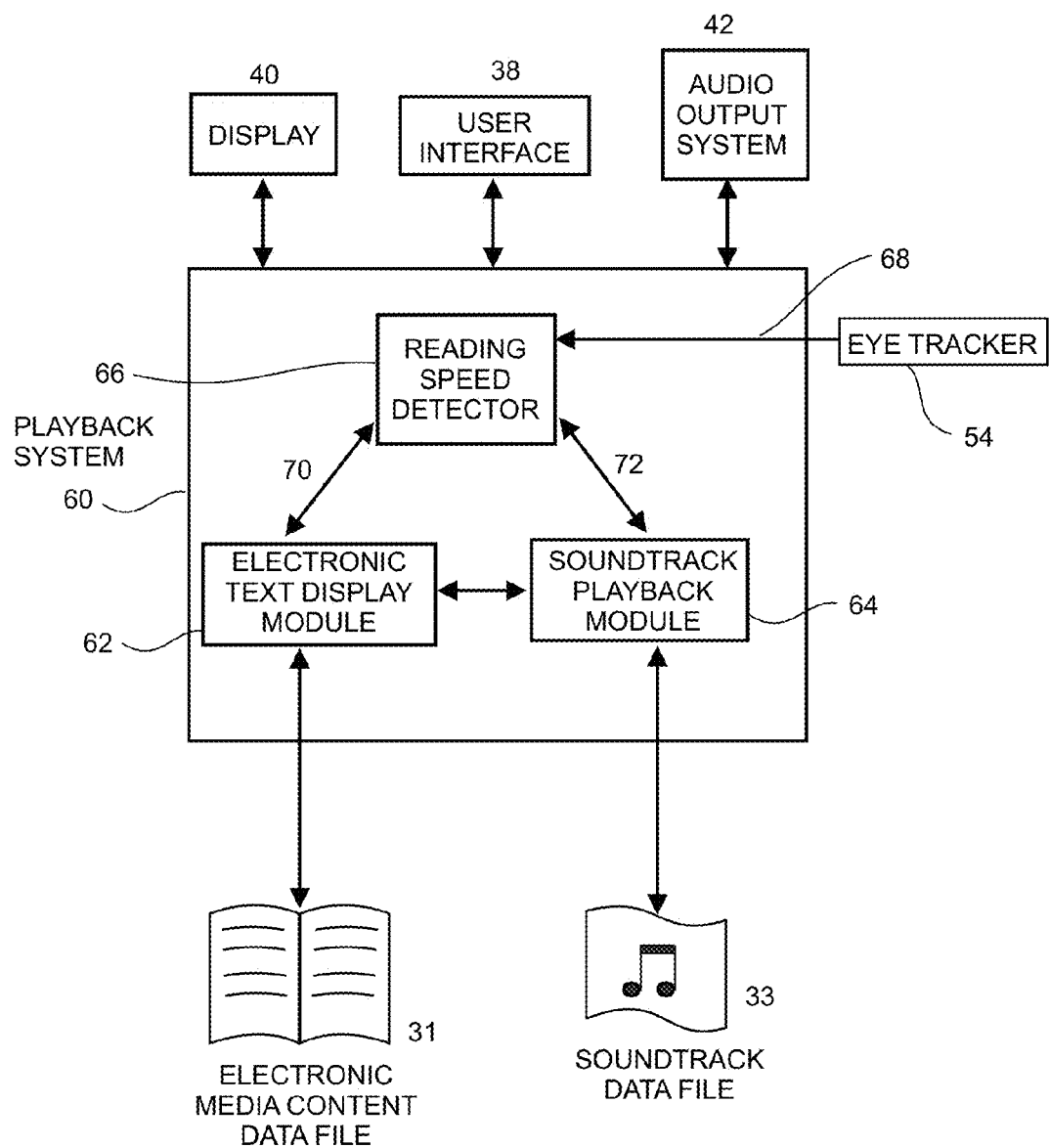
FIG. 4 is a schematic diagram of showing the main software modules or functionality of the playback system and their interaction with the hardware componentry in accordance with an embodiment of the invention.

Referring to FIG. 4, the primary functions and data processing of an embodiment of the playback system 60 will now be described. The various functions and data processing of the playback system 60 will be described with reference to dedicated modules configured to carry out the functions and data processing for clarity of description of the user playback system. It will be appreciated that the modules may be configured or implemented in software in various ways and that the processes and functions performed by the modules may be integrated into a reduced number of consolidated modules or further expanded and separated into a larger number of modules depending on design requirements.

The main modules of the playback system 60 are shown and their interaction with various components of the hardware platform on which the user playback system is running, such as a display 40, user interface 38, audio output system 42, and eye tracker 54. The other aspects of the hardware system, such as processor 32, memory 34, data storage 36 and any other communication links or components are not shown for clarity.

The playback system 64 is configured to receive and process the soundtrack data file 33 and associated electronic text data file 31, whether combined into a multimedia data file or stored as separate data files, to generate the visual display of the electronic text and audio playback of the accompanying soundtrack. The soundtrack data file or files, including all the audio tracks, are in some embodiments entirely downloaded in advance and stored locally on the user device before playback can commence, or in alternative embodiments the soundtrack is compiled in a remote server, e.g. in the cloud or similar, and streamed to the user device for playback.

Electronic Text Display

The playback system 60 comprises an electronic text display module 62 that is configured to process electronic text data 31 representing the electronic text and controls display of the electronic text on the display 40 in response to user input from the user interface 38. The display 38 may be a conventional electronic display (e.g. LCD or LED display screen) with the user interface 38 comprising any one or more typical input devices such as, but not limited to, buttons, dials, switches, mouse, touch-pad, keyboard, voice commands or any other tactile, auditory or visual user input system or device. In a preferred embodiment, the hardware device is provided with an integrated display 40 and user interface 38 in the form of a touch screen display, which are commonly available on many portable electronic devices, such as tablets, smartphones, notebooks and the like.

Soundtrack Playback Module

A soundtrack playback module 64 is provided for coordinating the playback of the audio regions of the soundtrack 33 over the audio output system 42 based on a reading position variable or counter indicative of the user's expected or estimated reading position in the electronic text to synchronize playback of the soundtrack with the user's reading of the electronic text. The soundtrack playback module operates in a similar manner to the playback module described in WO WO2013/015694. The soundtrack playback module 64 maintains a user reading position variable (such as a counter) that increments or changes at a rate based on a configurable user reading speed setting or variable, e.g. words per minute (wpm) or similar, that is indicative of the user's reading speed. The reading position counter may represent the word the user is currently reading, e.g. may be a word counter if the electronic text is indexed based on words. The reading position counter may be updated periodically or arbitrarily based on user interaction/input (e.g. page turns, scrolling, arbitrary reading position update inputs etc). The reading position module is also configured to receive control input indicative of the user commencing reading or pausing reading, and controls the reading position counter accordingly (e.g. starts or pauses the counter).

The soundtrack playback module 64 is configured to process the soundtrack data file and trigger or cue playback of the audio track files associated with the defined audio regions of the soundtrack based on the user reading position counter. In particular, the playback module 64 commences playback of the audio track file associated with an audio region when the reading position variable matches the start position defined for that audio region, and stops playback of the audio track file when the reading position variable matches the stop position defined for that audio region. It will be appreciated that two or more audio track files may be played concurrently when there are two or more overlapping audio regions and that each audio region can have other associated properties for playback that may or may not be dependent on reading speed such as volume and panning envelope control and other audio effects and properties, as described in WO2013/015694.

Reading Speed Detector

The user reading speed variable may be manually adjusted by the user or retrieved from historically stored reading speeds specific to the end user.

In this embodiment, the playback system 60 further comprises an automatic reading speed detector 66 that is configured to calculate continuously or periodically the user's real-time reading speed as they read based on eye tracking. In particular, the reading speed detector is configured to receive data or signals 68 from the eye tracker indicative of tracked eye movements or gaze point relating to either or both of the user's eyes as they read the electronic text presented on the display 40. The reading speed detector 66 is configured to compute periodic or continuous updated estimates of the user's reading speed based on the eye tracking signals 68 from the eye tracker 54 and supplementary scan rate data 70 from the electronic text display module 62 that about the nature of the text displayed, for example the words per line, number of words per page, whether for individual lines or pages or averages, and/or supplementary scan rate data relating to the individual reader, such as average number of words read per saccade for the reader. The reading speed detector 66 sends its calculated updated user reading speed estimates 72 to the soundtrack playback module to update the stored user reading speed variable upon which the reading speed counter increments, to thereby enhance the synchronization of the soundtrack playback.

By way of example, the reading speed detector 66 is configured to receive supplementary scan rate data comprising data of one or more types selected from data indicative of any one or more of the following:

the actual words per line for each individual line of the electronic text, an average value of the words per line for the entire item of electronic text, a moving average value of the words per line for a number of successive lines over a portion of the electronic text, such as over a page or multiple pages of the text, the actual words per page for each individual page of the electronic text, an average value of the words per page for the entire item of electronic text, a moving average value of the words per page for a number of successive pages of text, the average number of words read per saccade for as determined for the individual reader, and/or the average number of words read per saccade as determined based on statistical averages for the people having a reading speed corresponding to the reader.

In some embodiments, depending on the configuration of the reading speed detector 66, the supplementary scan rate data is received once, periodically, or continually, depending on the type or types of supplementary scan rate data supplied. It will be appreciated that the supplementary scan rate data indicative of the actual or average words per line or words per page may be determined by the electronic text display module 62 in various ways. In some forms, the electronic text display module may extract the supplementary scan rate data from the electronic text file itself, or in other forms may calculate the data by processing the electronic text file. In one example, the electronic text display module 62 may be configured to calculate an estimate of the average words per line or words per page based at least partly on the displayed font size and text display area (e.g. page display width).

Figure 5:
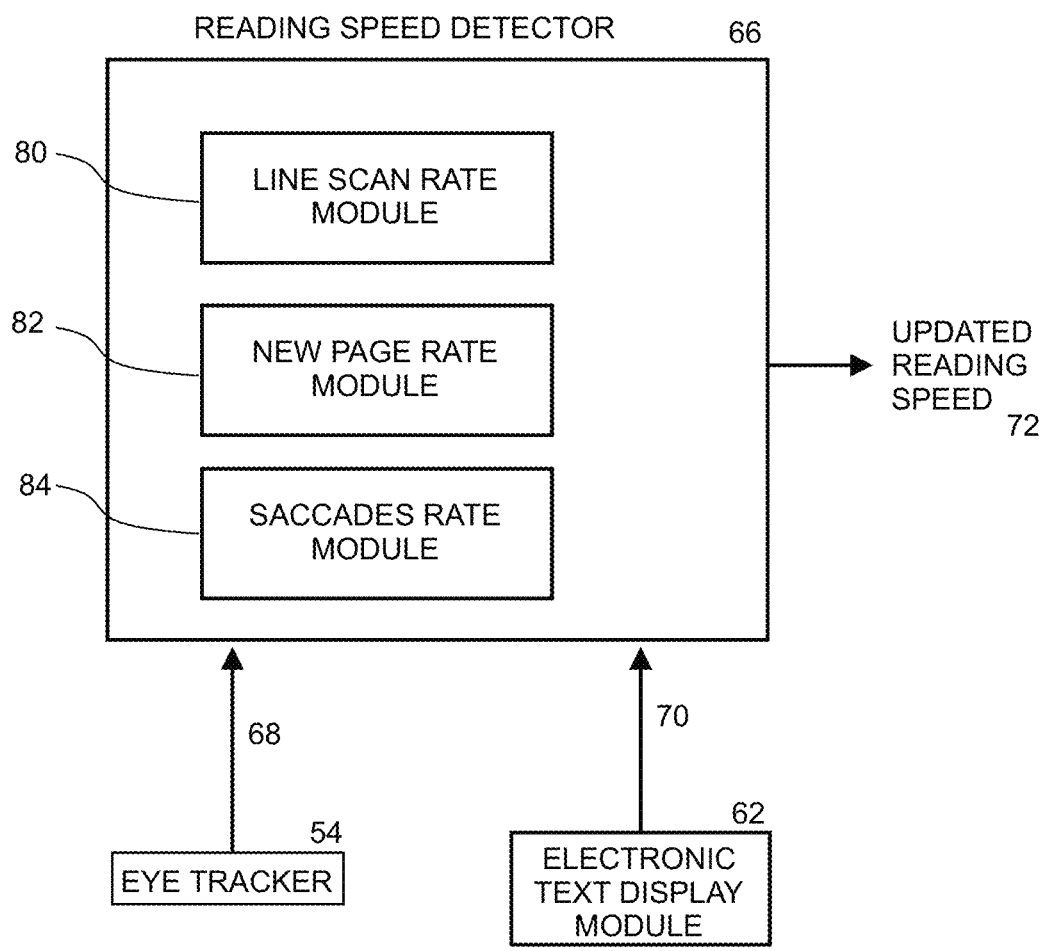
FIG. 5 is a schematic diagram showing the main software modules or functionality of a reading speed detector in accordance with an embodiment of the invention.

Referring to FIG. 5, the reading speed detector 66 will be explained in further detail. In brief, the reading speed detector comprises one or more rate modules 80, 82, 84 that are configured to determine a reading scan rate based on processing of eye movement signals 68 from the eye tracker 54. In some embodiments, the reading speed detector may comprise a single rate module 80, 82, 84 from which an updated reading speed estimate 72 is determined. In other embodiments, the reading speed detector may comprise a configuration of two or more rate modules 80, 82, 84 from which an updated reading speed estimate or estimates are determined. In such embodiments, either a single reading speed estimate that is an average of all estimates from the modules is generated, or one rate module is configured as the 'primary' rate module and the other remaining rate module or modules are 'secondary' or 'supplementary' modules that generate data to refine the reading speed estimate generated by the primary rate module, or all rate modules each independently generate a reading speed estimate signal for updating the stored user reading speed variable in the soundtrack playback module.

In one example embodiment, the reading speed detector comprises a primary line scan rate module 80, and optionally either or both of a supplementary new page rate module 82 and saccades rate module 84. Each of the modules is capable of generating an estimate of the user's reading speed. In this embodiment, the updated reading speed 72 output from the detector to the soundtrack playback module is based on the line scan rate module 80. In some embodiments, this primary reading speed estimate generated by the line scan rate module 80 may be further refined or updated base on the output or reading speed estimates generated by from the new page rate module 82 and saccades rate module 84.

By way of example, three different rate modules 80, 82, 84 will be described by way of example. As discussed, each rate module may be used on its own in some configurations of the reading speed detector, or each rate module may be used in combination with one or more different rate modules in other configurations of the reading speed detector. Each of the shown rate modules 80, 82, 84 is configured to generate a reading scan rate based on eye tracking signals 68 received from the eye tracker 54. Each different rate module 80, 82, 84 is configured to generate a reading scan rate at a different 'resolution'. The saccades rate module 84 generates a high-resolution reading scan rate such as saccade rate, e.g. number of saccades a user makes per unit of time. The line scan rate module 80 generates a medium-resolution reading scan rate such as line scan rate, e.g. number of lines a user reads per unit of time. The new page rate module generates a low-resolution reading scan rate such as page turn rate, e.g. number of pages a user reads per unit of time. As will be explained, each of the rate modules is configured to convert its respective reading scan rate to a user reading speed estimate, such as words per minute or similar, based on supplementary scan rate data. Each of the rate modules is further explained below with reference to FIGS. 6-8, respectively.

Line Scan Rate Module

The line scan rate module 80 is configured to detect eye movements via the eye tracker that are indicative of the user changing lines as they read the text to generate a line scan rate from which a user reading speed can be calculated.

Figure 6:
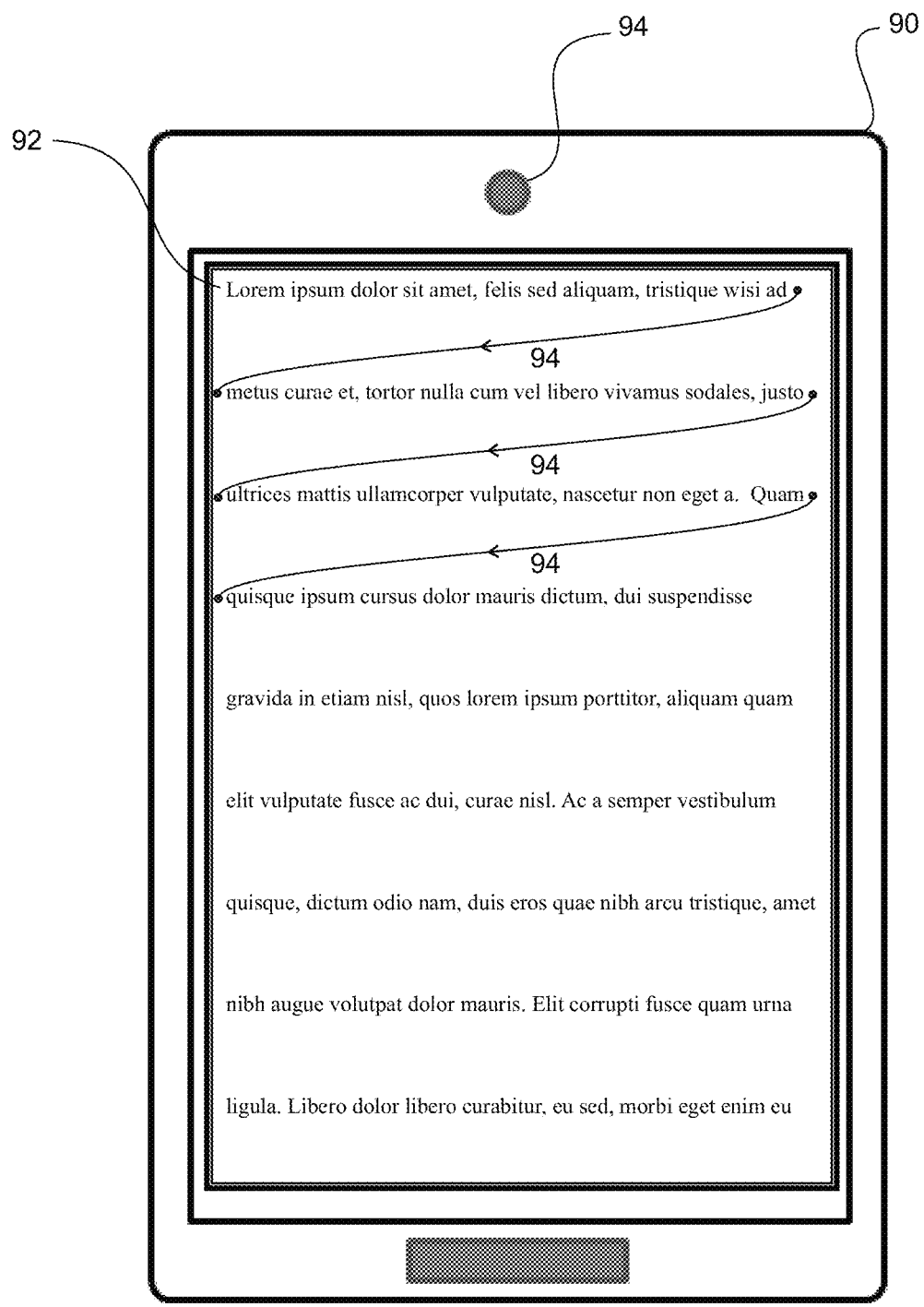
FIG. 6 is a diagram of a user device and the line change eye movements being detected by an eye tracker in accordance with an embodiment of the invention.

Referring to FIG. 6, an example hardware device 90 having a display 92 for presenting the electronic text and a user-facing optical sensor, e.g. digital camera 94, is shown. The images captured by the digital camera of one or both of the user's eyes are processed by the eye tracker software.

In one embodiment, the eye tracker is configured to track the movement of at least one eye of the user to detect line change eye movements. For example, in the context of text in the English language or equivalent languages comprising horizontal rows of text, the eye tracker detects left-right eye movements of the type shown by arrows 94 as the user moves from the end of one line to the start of the next line. It will be appreciated that alternatively the eye tracker can be configured to detect bottom-top eye movements in the context of Japanese language or equivalent languages comprising vertical columns of text. The line scan rate module 80 then determines the user's line scan rate based on detected line change movements and a timer. For example, the line scan rate may be determined as a number of lines per minute or per second. In some configurations, the line scan rate determines the user's line scan rate as an average line scan rate over multiple successive detected line change movements. In some configurations, the line scan rate may be a moving average. In this embodiment, the line scan rate can be determined without the knowledge of the exact position of the user's gaze on the display screen, i.e. it is the right-to-left movement that is important, which signals a line change generally. The exact line the user is reading need not necessarily be known either.

In another embodiment, the line scan rate module is configured to generate an estimate of the line scan rate by detecting from the eye tracking signals how long, i.e. the time interval or period, the user's gaze remains on the same line, regardless of where on the line, and calculating an average line scan rate for the user based on an average of the time periods over multiple successive lines. For example, if the user is determined as dwelling on each line for an average of 6 seconds, then this corresponds to a line scan rate of 10 lines per minute.

In either of these embodiments, the line scan rate module is then configured to calculate an estimate of the user's reading speed based on the line scan rate and supplementary scan rate data indicative of the average or actual quantity of electronic text per line (e.g. number of words or characters per line). For example, multiplying the line scan rate (in lines per minute) by the average or actual words per line results in a reading speed result in words per minute (wpm). This estimate of reading speed may then be either output 72 to the soundtrack playback module or alternatively combined or used to refine or modify the reading speed estimates of one or more other rate modules as described above before they are output to the playback module, depending on the configuration of the reading speed detector.

New Page Rate Module

Figure 7:
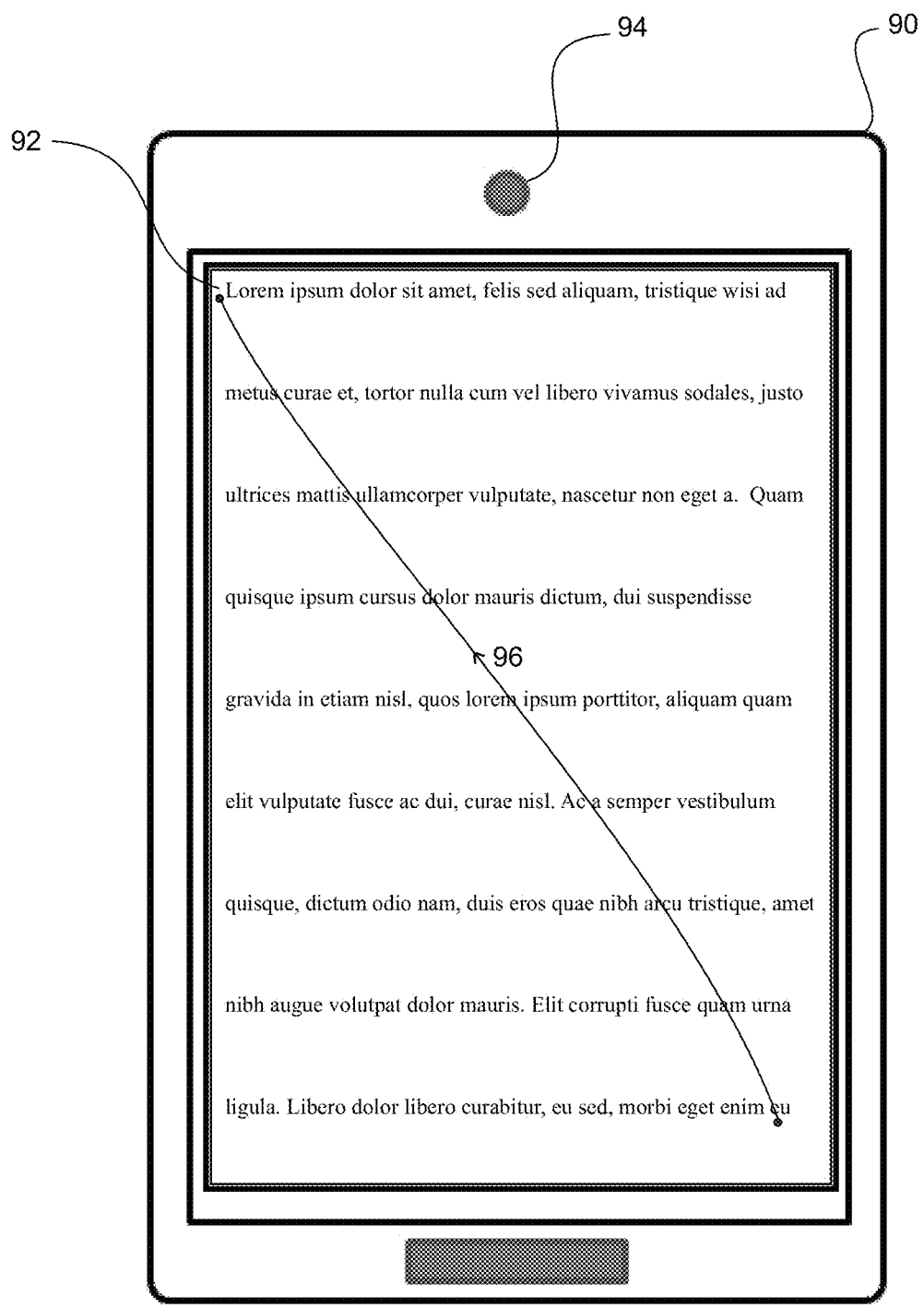
FIG. 7 is a diagram of a user device and the page change eye movements being detected by an eye tracker in accordance with an embodiment of the invention.

The new page rate module 82 is configured to detect eye movements via the eye tracker that are indicative of the user changing pages, i.e. as they page turn in an e-book for example. The new page rate module 82 can calculate an estimate of the user's reading speed. Referring to FIG. 7, the same example hardware device 90 as described in FIG. 6 is shown, and will be used to describe example implementations of the new page rate module 82 below.

In one embodiment of this new page rate module 82, the eye tracker 54 is configured to track the movement of at least one eye of the user to detect page change eye movements. For example, the eye tracker is configured to detect gross eye movements in which the user's gaze traverses from at or toward the bottom (typically but not necessarily the right-hand corner) of the display to the top (typically but not necessarily the left-hand corner) of the display, i.e. diagonal bottom-to-top eye movements shown by arrow 96, in the context of English language or equivalents for example, although it will be appreciated that the gross eye movement will be in a different direction for Japanese language text or equivalents comprising columns of text. In this embodiment, the new page rate module 82 may then determine the user's page turn rate based on the time interval between detected page change movements, and in some embodiments this is a moving average. An estimate of the user's reading speed is then calculated based on the page turn rate and supplementary scan rate data 70 indicative of the average or actual quantity of electronic text per page received from the electronic text display module 62. For example, multiplying the page turn rate (in pages per minute) by the average or actual words per page results in a reading speed result in words per minute (wpm). This estimate of reading speed may then be either output 72 to the soundtrack playback module, or combined with or used to modify or refine the reading speed estimates generated by one of the other rate modules before they are output to the playback module, depending on the configuration of the reading speed detector.

In another embodiment of this new page rate module 82, the eye tracker 54 is configured to initiate a timer when the user turns to a new page of the electronic text (e.g. by receiving a page turn signal or data 70 from the electronic text display module 62). The module then tracks the movement of at least one eye of the user with the eye tracker 54 as to detect a page change eye movement as described above. Upon detection of a page change eye movement (which is indicative of the user reaching the end of the page), the module is configured to calculate an estimate of the user's reading speed based on supplementary scan rate data 70 indicative of the actual quantity of electronic text on that particular page received from the electronic text display module 62 and the value of the timer at the detected page change eye movement. Again, this estimate of reading speed may then be either output 72 to the soundtrack playback module, or combined with or used to modify or refine the reading speed estimates generated by one of the other rate modules before they are output to the playback module, depending on the configuration of the reading speed detector.

In some embodiments, the new page rate module may be configured to ignore detected page turns that appear to be outliers relative to the moving average, to allow for situations where the reader may be skimming, leafing or otherwise flicking through pages of the electronic text.

In some configurations, the reading speed detector may be configured to generate a page turn signal in response to each detected page change eye movement, and send that to the electronic text display module 62 to cause it to turn to the next page in the electronic text. In this configuration, the eye tracker is arranged as an automatic page-turner upon detection of a page change eye movement.

Saccades Rate Module

Figure 8:
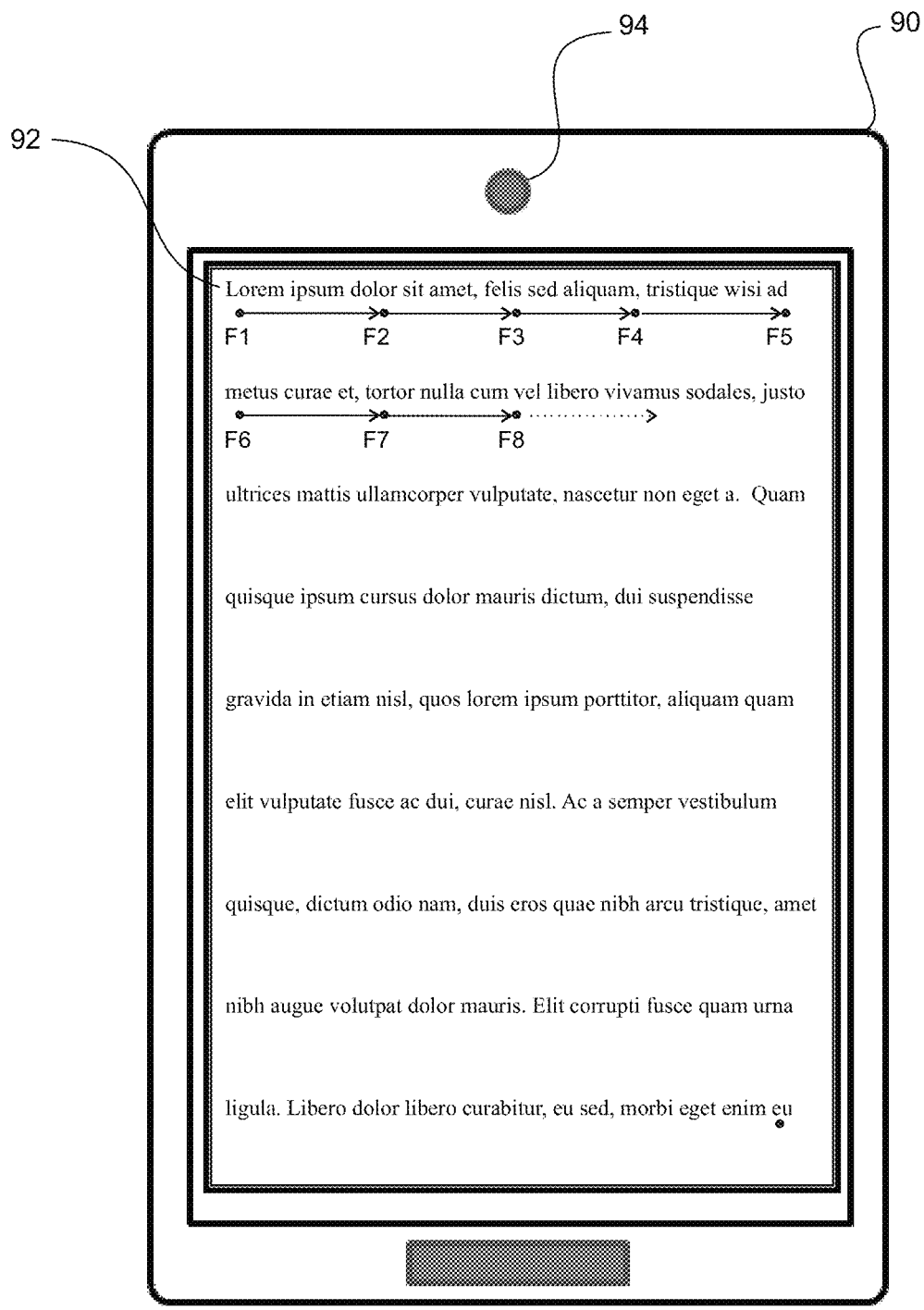
FIG. 8 is a diagram of a user device and the gaze fixation points between saccades being detected by an eye tracker in accordance with an embodiment of the invention.

The saccades rate module 84 is configured to detect eye movements via the eye tracker 54 that are indicative of gaze fixation points between saccades as the user's eyes traverse the horizontal scan path of a line of text. The module determines a saccade rate based on these eye movements, from which an estimate of user reading speed can be determined. Referring to FIG. 8, the same example hardware device 90 as described in FIG. 6 is shown, and will be used to describe example implementations of the saccades rate module 82 below.

In this module 84, the gaze fixation points indicated at F1-F8 by example are detected by the eye tracker. In this configuration, the eye tracker need not necessarily detect the exact location of the fixation points, just that the user's gaze has temporarily fixated. The module 84 then determines a saccade rate based on the time interval between detected gaze fixation points. The saccade rate may be a numerical value such as the average number of saccades a user makes per unit of time, such as average number of saccades per second or minute or other suitable time unit. The module 84 then calculates an estimate of the user's reading speed based on the saccade rate and supplementary scan rate data indicative of the average quantity of electronic text between gaze fixation points for the user. In some embodiments, the data indicative of the average quantity of text traversed per saccade may be based on general population averages or typical averages associated with the user's nominal reading speed. In other embodiments, the exact position of the gaze fixation points may be determined by the eye tracker and the average number of words traversed per saccade may be calculated in real-time.

The estimate of reading speed generated by the module 84 may then either be output 72 to the soundtrack playback module, or combined with or used to modify or refine the reading speed estimates generated by one of the other rate modules before they are output to the playback module, depending on the configuration of the reading speed detector.

Real-Time Reading Position Detector

In some embodiments, the system may be configured to determine the user's reading position in the electronic text based on the determined reading scan rate generated by any one or more of the rate modules of the reading speed detector.

For example, the system may be configured to detect a first positional information of the user's reading position at a first time, e.g. by the turning of a page which generates a page turn signal, a touch input on a touch screen display indicative of the current word the user is reading, or another navigation input for traversing the electronic text. A timer records a first time at the detection of the first reading position. The reading scan rate detected by the eye tracker is then monitored and a reading speed calculated as discussed above, depending on the rate module used. The reader's current real-time position can then be calculated by multiplying the time differential from the first time multiplied by the calculated reading speed, and adding that to the first reading position. The user's real-time current position can be used to update the reading position variable or for other purposes.

4. General

Embodiments of the invention may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the foregoing, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" and "computer readable medium" include, but are not limited to portable or fixed storage devices, optical storage devices, and/or various other mediums capable of storing, containing or carrying instruction(s) and/or data.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One or more of the components and functions illustrated the figures may be rearranged and/or combined into a single component or embodied in several components without departing from the invention. Additional elements or components may also be added without departing from the invention. Additionally, the features described herein may be implemented in software, hardware, or combination thereof.

In its various aspects, the invention can be embodied in a computer-implemented process, a machine (such as an electronic device, or a general purpose computer or other device that provides a platform on which computer programs can be executed), processes performed by these machines, or an article of manufacture. Such articles can include a computer program product or digital information product in which a computer readable storage medium containing computer program instructions or computer readable data stored thereon, and processes and machines that create and use these articles of manufacture.

The foregoing description of the invention includes preferred forms thereof. Modifications may be made thereto without departing from the scope of the invention as defined by the accompanying claims.

What is claimed is:

1. A method for displaying electronic text and synchronizing playback of a soundtrack for the electronic text, the soundtrack comprising multiple audio regions configured for playback during corresponding text regions of the electronic text, each audio region being defined by audio data comprising: an audio track for playback in the audio region, a start text position indicative of a word in the electronic text corresponding to where playback of the audio track is to begin; and a stop text position indicative of the word in the electronic text comprising to where playback of the audio track is to cease, comprising:

displaying at least a portion of the electronic text on a display;

tracking a movement of at least one eye of a user with an eye tracker to detect at least one of a predetermined type of eye movements;

determining a reading scan rate of the user based on the detected type of eye movements and a timer, the reading scan rate being a value indicative of a number of eye movements per unit of time without requiring detection of an exact position of a user's gaze within the electronic text;

calculating an estimate of the user's reading speed based on the determined reading scan rate and supplementary scan rate data relating to the electronic text and/or user that is indicative of an actual or average quantity of electronic text per detected type of eye movements;

updating a user reading speed variable representing the user's reading speed based at least partly on the calculated estimate of the user's reading speed;

maintaining a reading position counter corresponding to an estimated text position indicative of a word in the electronic text that the user is currently reading, the reading position counter incrementing at a rate based on the user reading speed variable; and controlling playback of the audio track for the audio region of the soundtrack over an audio output system based on the audio data and on the reading position counter to synchronize playback of the audio regions with the user's estimated text position.

2. The method according to claim 1 wherein the reading scan rate is a line scan rate and determining the line scan rate comprises:

processing the movement of at least one eye from the eye tracker to detect line change eye movements by detecting eye movements in a direction opposite from a reading direction of a line or column in the electronic text;

determining the user's line scan rate based on detected line change eye movements and a timer, the line scan rate being a numerical value indicative of a number of lines read per unit time; and calculating an estimate of the user's reading speed based on the line scan rate and supplementary scan rate data indicative of the average or actual quantity of electronic text per line.

3. The method according to claim 2 wherein the method comprises determining the user's line scan rate as an average line scan rate over multiple successive detected line change eye movements.

4. The method according to claim 3 wherein the line scan rate is a moving average.

5. The method according to claim 1 wherein the reading scan rate is a page turn rate and determining the page turn rate comprises:

processing the movement of at least one eye from the eye tracker to detect page change eye movements, the page change eye movements indicative of the user changing a reading position in the electronic text from an end of a current page of the electronic text to a start of a next page of electronic text;

determining the user's page turn rate based on a time interval between detected page change eye movements, the page turn rate being a numerical value indicative of a number of pages a user reads per unit of time; and calculating an estimate of the user's reading speed based on the page turn rate and supplementary scan rate data indicative of the average or actual quantity of electronic text per page.

6. The method according to claim 1 wherein the reading scan rate is a page turn rate and determining the page turn rate comprises:

initiating a timer when the user turns to a new page of the electronic text;

processing, subsequent to initiating the timer, the movement of at least one eye from the eye tracker to detect a page change eye movement, the page change eye movement indicative of the user changing the reading position in the electronic text from an end of a current page of the electronic text to the start of a next page of electronic text; and calculating an estimate of the user's reading speed based on supplementary scan rate data indicative of the quantity of electronic text on the page and the value of the timer at the detected page change eye movement.

7. The method according to claim 1 further comprising processing the movement of at least one eye from the eye tracker to detect a page change eye movement, and generating a page turn signal in response to the detected page change eye movement to cause an electronic text display module to turn to a next page in the electronic text.

8. The method according to claim 1 wherein the reading scan rate is a saccade rate and determining the saccade rate comprises:

processing the movement of at least one eye from the eye tracker to detect gaze fixation points between saccades, the gaze fixation points representing when the user's gaze has temporarily fixated without requiring detection of an exact position of the user's gaze within the electronic text;

determining the user's saccade rate based on a time interval between detected gaze fixation points, the saccade rate being a numerical value indicative of a number of saccades a user makes per unit of time; and calculating an estimate of the user's reading speed based on the saccade rate and supplementary scan rate data indicative of the average or actual quantity of electronic text between gaze fixation points.

9. The method according to claim 8 wherein the supplementary scan rate data comprises data indicative of an average quantity of text traversed per saccade for the user.

10. A system for displaying electronic text and controlling playback of a soundtrack synchronized to the reading speed of a user comprising:

a display configured to display the electronic text;

a user interface configured to receive user input to control the system;

an audio output system that is operable to generate audio output for the user to hear;

an electronic text display module configured to process electronic text data representing the electronic text and control display of the electronic text on the display in response to user input from the user interface;

a soundtrack playback module configured to: generate a reading position counter corresponding to an estimated current text position indicative of a word in the electronic text that the user is currently reading, the reading position counter incrementing at a rate based at least partly on a configurable user reading speed variable representing the user's reading speed; and process soundtrack data representing the soundtrack to control playback of the soundtrack over the audio output system, the soundtrack data defining multiple audio regions for the soundtrack, each audio region being defined by audio data comprising:

an audio track for playback in the audio region;

a start text position indicative of the word in the electronic text corresponding to where playback of the audio region is to begin; and a stop text position indicative of the word in the electronic text corresponding to where the playback of the audio region is to cease;

wherein the soundtrack playback module is configured to coordinate playback of the audio track for the audio region based on the reading position counter to synchronize playback of the audio regions of the soundtrack with the user's reading of the electronic text; and a reading speed detector that is configured to:

track a movement of at least one eye of the user with an eye tracker to detect at least one of a predetermined type of eye movements;

determine the user's reading scan rate based on the detected type of eye movements and a timer, the reading scan rate being a value indicative of a number of eye movements per unit time without requiring detection of an exact position of a user's gaze within the electronic text; and calculate an estimate of the user's reading speed based on the determined reading scan rate and supplementary scan rate data relating to the electronic text and/or user that is indicative of an actual or average quantity of electronic text per type of detected eye movement, wherein the soundtrack playback module is configured to update the user reading speed variable at least partly based on the estimate of the user's reading speed as calculated by the reading speed detector.

11. The system according to claim 10 wherein the reading scan rate is a line scan rate and the reading speed detector is configured to:

processing the movement of at least one eye from the eye tracker to detect line change eye movements by detecting eye movements in a direction opposite from a reading direction of a line or column in the electronic text;

determine the user's line scan rate based on the detected line change eye movements and a timer, the line scan rate being a numerical value indicative of a number of lines read per unit time; and calculate an estimate of the user's reading speed based on the line scan rate and supplementary scan rate data indicative of the average or actual quantity of electronic text per line.

12. The system according to claim 11 wherein the reading speed detector is configured to: determine the user's line scan rate as an average line scan rate over multiple successive detected line change eye movements.

13. The system according to claim 12 wherein the line scan rate is a moving average.

14. The system according to claim 10 wherein the reading scan rate is a page turn rate and the reading speed detector is configured to:

processing the movement of at least one eye from the eye tracker to detect page change eye movements, the page change eye movements indicative of the user changing a reading position in the electronic text from an end of a current page of the electronic text to a start of a next page of electronic text;

determine the user's page turn rate based on a time interval between detected page change eye movements, the page turn rate being a numerical value indicative of a number of pages a user reads per unit of time; and calculate an estimate of the user's reading speed based on the page turn rate and supplementary scan rate data indicative of the average or actual quantity of electronic text per page.

15. The system according to claim 10 wherein the reading scan rate is a page turn rate and the reading speed detector is configured to:

initiate a timer when the user turns to a new page of the electronic text;

processing, subsequent to initiating the timer, the movement of at least one eye from the eye tracker to detect a page change eye movement by detecting eye movements, the page change eye movement indicative of the user changing the reading position in the electronic text from an end of a current page of the electronic text to the start of a next page of electronic text; and calculate an estimate of the user's reading speed based on supplementary scan rate data indicative of the quantity of electronic text on the page and the value of the timer at the detected page change eye movement.

16. The system according to claim 10 wherein the reading scan rate is a saccade rate and the reading speed detector is configured to:

process the movement of at least one eye from the eye tracker to detect gaze fixation points between saccades, the gaze fixation points representing when the user's gaze has temporarily fixated without requiring detection of an exact position of the user's gaze within the electronic text;

determine the user's saccade rate based on a time interval between detected gaze fixations, the saccade rate being a numerical value indicative of a number of saccades a user makes per unit of time; and calculate an estimate of the user's reading speed based on the saccade rate and supplementary scan rate data indicative of the average or actual quantity of electronic text between successive gaze fixation points.

17. The system according to claim 16 wherein the supplementary scan rate data comprises data indicative of an average quantity of text traversed per saccade for the user.

18. The system according to claim 10 wherein the system is further configured to process the movement of at least one eye to detect a page change eye movement, and generate a page turn signal in response to the detected page change eye movement to cause the electronic text display module to turn to a next page in the electronic text.

19. The system according to claim 10 wherein the system is implemented on a hardware system and the eye tracker comprises an optical sensor or sensors having a field of view that at least captures one or both of the user's eyes.

20. A method of estimating a reader's reading position in an electronic text comprising:

using a first means to locate a first reading position of a reader at a first time;

detecting a reading scan rate of the reader by tracking a reader's eye movements using an eye tracker to detect at least one of a predetermined type of eye movements, the reading scan rate based on the detected type of eye movements and based on a timer, the reading scan rate being a value indicative of a number of eye movements per unit of time without requiring detection of an exact position of a reader's gaze within the electronic text;

using the detected reading scan rate to estimate a reading speed of the reader based on supplementary scan rate data relating to the electronic text and/or reader that is indicative of an actual or average quantity of electronic text per type of detected eye movement; and estimating a reader's reading position at a second time based on an incremental time from the first time, the estimated reading speed and the first reading position.

21. The method according to claim 20 wherein the first reading position is determined from any of the following: a page turn signal, a touch input on a touch screen display showing the electronic text, and/or or a navigational input for traversing electronic text.

* * * * *